(12) United States Patent
Drozt et al.

(10) Patent No.: US 7,035,658 B2
(45) Date of Patent: Apr. 25, 2006

(54) WIRELESS COMMUNICATION DEVICE AND NETWORK CONTROLLER FOR AFFILIATION WITH ASSOCIATED GROUPS AND METHOD THEREOF

(75) Inventors: Peter M. Drozt, Prairie Grove, IL (US); Laura A. Christensen, Arlington Heights, IL (US); William A. Felderman, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 126 days.

(21) Appl. No.: 10/377,233

(22) Filed: Feb. 28, 2003

(65) Prior Publication Data

US 2004/0185890 A1 Sep. 23, 2004

(51) Int. Cl.
*H04B 7/00* (2006.01)

(52) U.S. Cl. ............... 455/519; 455/414.1; 455/518

(58) Field of Classification Search ............. 455/519, 455/518, 520, 517, 426, 466, 521, 524, 414.1, 455/418, 412, 552, 412.1, 412.2, 522
See application file for complete search history.

(56) References Cited

U.S. PATENT DOCUMENTS

| | | | | |
|---|---|---|---|---|
| 5,349,342 A | * | 9/1994 | Nilles et al. ............... 340/2.1 |
| 5,371,900 A | * | 12/1994 | Bar-On et al. ............ 455/508 |
| 5,423,061 A | | 6/1995 | Fumarolo et al. |
| 5,758,291 A | * | 5/1998 | Grube et al. ............... 455/518 |
| 5,790,962 A | * | 8/1998 | Grube et al. ............... 455/518 |
| 5,933,780 A | | 8/1999 | Connor et al. |
| 6,026,296 A | * | 2/2000 | Sanders et al. .......... 455/426.1 |
| 6,104,925 A | * | 8/2000 | Grube et al. ............... 455/428 |
| 6,163,697 A | | 12/2000 | Peterson et al. |
| 6,208,872 B1 | * | 3/2001 | Schmidt .................... 455/518 |
| 6,219,548 B1 | | 4/2001 | Feltner et al. |
| 6,405,050 B1 | * | 6/2002 | Amirijoo et al. .......... 455/518 |
| 6,545,995 B1 | * | 4/2003 | Kinnunen et al. ......... 370/341 |
| 6,600,930 B1 | * | 7/2003 | Sakurai et al. ........... 455/414.3 |
| 2002/0094803 A1 | * | 7/2002 | Burgan et al. ............. 455/412 |
| 2003/0017836 A1 | * | 1/2003 | Vishwanathan et al. .... 455/517 |
| 2003/0050986 A1 | * | 3/2003 | Matthews et al. ......... 709/206 |
| 2003/0083086 A1 | * | 5/2003 | Toyryla et al. ............ 455/518 |
| 2003/0224816 A1 | * | 12/2003 | Kundaje et al. ........... 455/518 |
| 2004/0002351 A1 | * | 1/2004 | Upp et al. ................. 455/519 |
| 2004/0058698 A1 | * | 3/2004 | Crockett et al. ........... 455/518 |
| 2004/0137882 A1 | * | 7/2004 | Forsyth .................... 455/414.1 |
| 2004/0198353 A1 | * | 10/2004 | Quick, Jr. ................ 455/435.1 |
| 2004/0198376 A1 | * | 10/2004 | Chandhok et al. ........ 455/456.1 |
| 2004/0203770 A1 | * | 10/2004 | Chen et al. .............. 455/435.1 |
| 2005/0014522 A1 | * | 1/2005 | Tirabassi et al. ........... 455/518 |

* cited by examiner

*Primary Examiner*—Tilahun Gesesse
*Assistant Examiner*—Tan Trinh
(74) *Attorney, Agent, or Firm*—Simon B. Anolick (57) ABSTRACT

A wireless communication device facilitated by a network controller and corresponding methods select a list of requested groups for affiliation from a list of associated groups. The list of requested groups is sent to a network infrastructure where it is processed according to a set of rules. A final list of groups for affiliation is made and the network infrastructure is configured to support the affiliated groups. The list of affiliated groups may also be sent to the wireless communication device.

11 Claims, 6 Drawing Sheets

WIRELESS COMMUNICATION DEVICE AND NETWORK CONTROLLER FOR AFFILIATION WITH ASSOCIATED GROUPS AND METHOD THEREOF

FIELD OF THE INVENTION

This invention relates in general to communication systems, and more specifically to a method and apparatus for affiliation with associated groups by a wireless communication device.

BACKGROUND OF THE INVENTION

Wireless communication devices capable of "dispatch communication" between devices are available. An example of these are wireless communication devices from Motorola operating on an integrated digital enhanced network provided by Nextel in the United States. The dispatch communication feature is known among other things as "walkie talkie" or "PTT" communications. In many such devices, it is possible to arrange a number of users into a unit or group for ease of operation in using the dispatch communication feature. When the wireless communication device is a member of a particular group or talk group it is "associated" with that group. A wireless communication device may be associated with one or more groups. When the wireless communication device is enabled to operate within one of its associated groups, that is, able to select the group and commence dispatch communication, the wireless communication device is "affiliated" with that group. Currently, the wireless communication device may only select one affiliated group at a time from those with which it is associated. The affiliated group may be a predefined set of associated groups known as multiple simultaneous talkgroups. There is no interactive way for a device or user thereof to define a list of affiliation groups. Further, the user of a wireless communication device has no formal way of discovering or determining the groups with which it is associated, leaving that to word of mouth or other informal means.

Clearly a need exists for solutions to these problems of interactive affiliation with multiple groups or talk groups and group discovery.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

In overview, the present disclosure concerns wireless communication devices, communications infrastructure including a network controller, and methods for or that provide group communication services to users thereof. More particularly, various inventive concepts and principles embodied in methods and apparatus for the interactive selection of groups and rules associated with the selection are discussed. The wireless communication devices and network controllers of particular interest are those constructed to allow users to communicate in a mode commonly known as dispatch communication and alternately referred to as "walkie-talkie," instant communication, PTT communication, one button communication or other names by suppliers, such as Nextel Communications. When so enabled, the wireless communication device can be used to select another particular wireless communication device for example, by name, symbol, or the like. The selection is translated to a unique identifier, and when a "talk" or "Push To Talk (PTT)" button is pressed, the unique identifier is used to set up a channel between the respective devices. When the talk or PTT button is depressed, the user is able to talk to the other device, when the talk button is released the user may listen to communications from the other wireless communication device. At the end of a conversation, for example, after a designated time of inactivity, the channel or connection is torn down and the resources made available for other instant or dispatch communication. A concept of "group call" also known as Group Connect[SM] a service mark of Nextel Communications, may also be supported whereby a user of the wireless communication device may simultaneously talk to all members of the affiliated predefined group, who are themselves currently affiliated with that group. The wireless communication device may belong to or be associated with more than one group, for example, as a member of a group of coworkers and as a member of a group of family members.

While the concept of an associated group used in connection with the dispatch communication feature offers a convenience to the user, the current requirement that a wireless communication device be affiliated with a single group of its many possible associated groups limits its usefulness. There are situations where the user of the wireless communication device may need or desire to have dispatch communication with members of different associated groups. This might be the case when on a job site and the need to be in touch with a co-worker on one associated group is high but when a family situation requires that communication be maintained with a family member whose wireless communication device belongs to a second associated group. Another purpose for affiliating with multiple associated groups would be to allow work groups to exist in smaller units, perhaps matching typical project groupings, but when required for a large project or emergency situation, the work groups could be easily united allowing for more efficient communication. Furthermore, a user needs to have interactive control of affiliated groups.

Another limitation to the current application of dispatch communication is the lack of an automated or formal method for a user to know the groups with which his or her wireless communication device is associated. Informal methods such as word of mouth or taking the device to a center for programming are the principal methods for a user to determine a group with which they may affiliate. The ability to have a list of associated groups sent to a wireless communication device and to be able to view and select from that list is a significant improvement over previous devices.

As further discussed below, various inventive principals and combinations thereof are advantageously employed to allow the user of the wireless communication device greater flexibility in both discovering available groups and selecting from those groups to enable multiple group communication.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
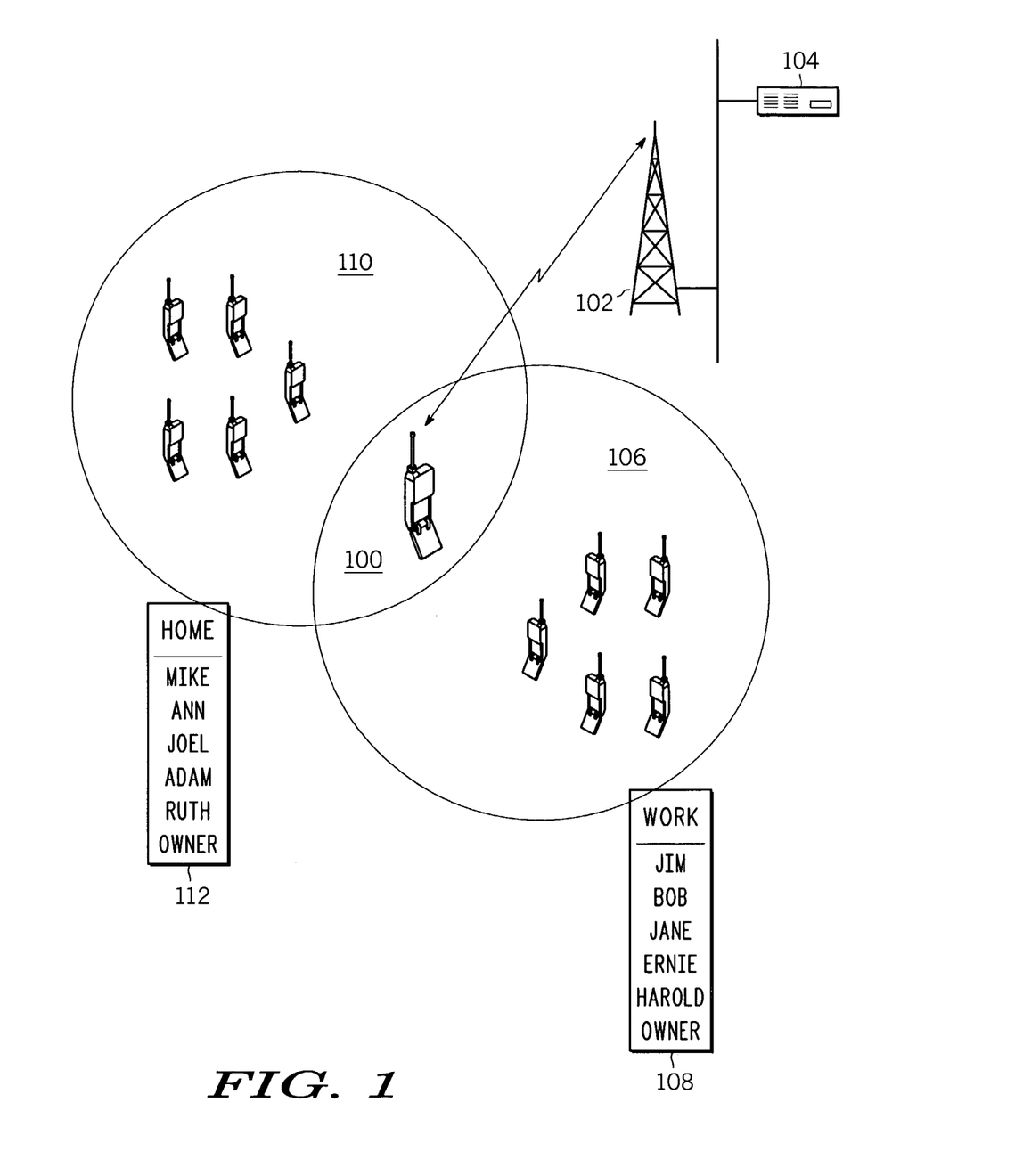
FIG. 1 depicts, in a simplified and representative form, a block diagram of a communications system suitable for supporting group communication.

Referring to FIG. 1, a block diagram of a simplified and representative communications system supporting group communication will be discussed and described. A wireless communication device 100 is designed and constructed to support group communications. The wireless communication device 100 is operable to communicate wirelessly to a network infrastructure 102 comprising and managed in some part by a network controller 104. Note that the network controller 104 while depicted as a single unit may be a combination of controllers or a control function comprising a plurality of processing boxes and the like that are co-located or separately located. The wireless communication device 100 is shown in this example as associated with or as a member of a first group A 106 comprising a plurality of members as shown in a representative case by group A membership 108, for example individuals and corresponding wireless devices from a work team. The wireless communication device 100 is shown as also being associated with or as a member of a second group, group B 110 comprising a plurality of members as shown in a representative case by group B membership 112, for example persons and corresponding wireless devices from an immediate family. The wireless communication device 100 is depicted as the only mutual member of the two groups, but this is not a necessary condition. The wireless communication device 100 corresponds to the label "Owner" in group A membership 108 and group B membership 112.

All groups of which the wireless communication device 100 is a member are called the associated groups for the wireless communication device. The portion of the groups to which the wireless communication device 100 is actually enabled for dispatch communication at any given time are called the affiliated groups for the wireless communication device. Note that the terms 'associated groups' and 'affiliated groups' are used frequently in the following description and are used in the context as defined above.

The wireless communication device 100 is similar in form and function to any of a number of commercial devices such as a Motorola model i95, provided such commercial devices are constructed in accordance with the principles and concepts discussed and disclosed herein. The network infrastructure 102 is a commercially available wireless communication network, as might be exemplified by a Motorola Integrated Digital Enhanced Network provided the network and various constituent equipment is modified and improved in accordance with the principles and concepts discussed herein. The network controller 104, a consitituent part of the network infrastructure, may be any of a number of commercially available servers, such as a Sun Microsystems™ server running the Solaris operating system comprising volatile and non-volatile memory and further programmed in accordance with the current invention.

Figure 2:
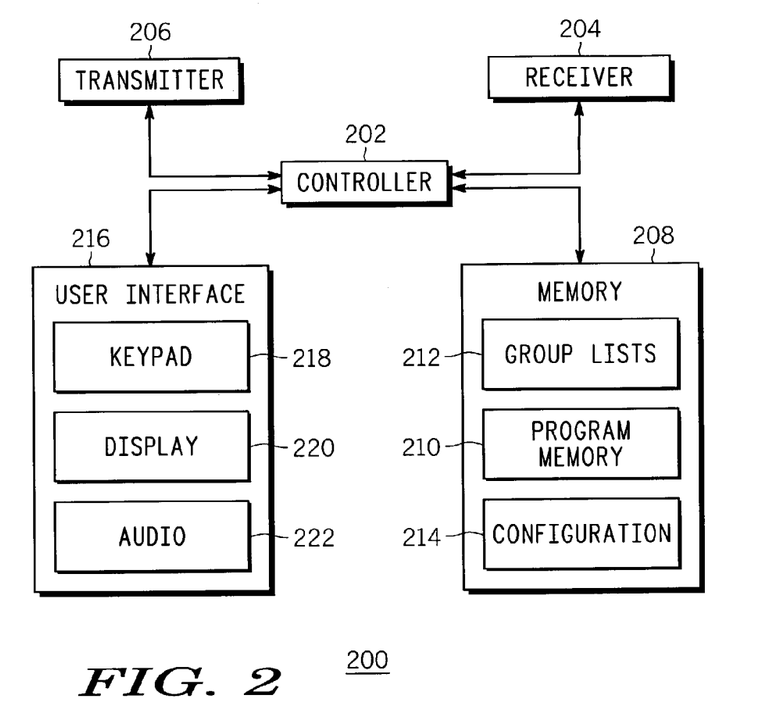
FIG. 2 depicts, a block diagram of a wireless communication device suitable for use in the FIG. 1 system.

Referring to FIG. 2, a block diagram of a wireless communication device 200 arranged and constructed to request group affiliation will be discussed and described. This wireless device is suitable for use in the FIG. 1 communications system and may be similar to the device 100 of that FIG. The wireless communication device includes a controller 202 that is known and typically comprised of one or more microprocessors or digital signal processors available from various manufacturers such as Motorola. The controller 202 is coupled to and controls both a receiver 204 and transmitter 206 that operate to receive and transmit various messages, including control messages such as channel allocation and group information and traffic messages such as voice messages or text messages. The transmitter and receiver are known and are typical of cellular telephone devices, particularly the Integrated Digital Enhanced Network wireless communication devices available from Motorola.

The controller 202 is further shown coupled to a memory 208. The memory, in addition to including program memory 210, typically including executable or object code that is executed by the controller to perform general control of the wireless communication device as well as user interface functions related to keypad and display operation, will include various databases and lists including group lists 212 and wireless communication device configuration information 214. The memory in current wireless communication devices capable of supporting the current invention may be included as part of the microprocessor/controller chip and is likely supplemented by external volatile and non-volatile memory from various commercial semiconductor manufacturers such as Motorola, Micron Semiconductor, Toshiba and the like.

The controller 202 is further coupled to a user interface 216 including, for example, a keypad 218, display 220, and audio transducer and circuitry 222. All the elements of the user interface 216 are typical of a cellular telephone and are commonly available, including the typically liquid crystal display, monochrome or color, the keyboard comprises number keys for entering digits and special function keys, minimally for starting and ending a phone call but also for accessing special functions of the phone, such as the PTT function, the audio circuitry comprising a speaker and microphone, volume controls, and in some cases audible ringing signals.

In operation, typically when indicated by a user via the user interface that a change in group affiliation is requested, the controller 202 may retrieve from the group list memory 212 a list of groups with which the wireless communication device 200 is currently known to be associated or perhaps a list of presently affiliated groups. This list, preferably list of associated groups, may be displayed in full or in part and the user of the wireless communication device is able to select from the list to create a list of requested affiliation groups. The user may be allowed variations in the selection presentation and process, in one exemplary case, all associated groups are presented and the user selects all the groups for the list of requested affiliation groups. In another example, the list of associated groups may be shown with the current affiliation status for each with the user able to indicate only the changes by way of additions and deletions that are to be made from the current affiliation. In most or many cases the user is allowed to select additional associated groups for affiliation.

In the representative case being used for illustration, there may be three categories of a associated groups: mandatory or compulsory groups, optional groups and automatic or preset groups. Mandatory or compulsory groups are those that are required for affiliation. This may be the case where the wireless communication device 200 is actually provided by a corporation or other third party that expects the user thereof to always have an affilation with one or more groups, such as work related groups. Optional groups are those that the user may choose to affiliate with and are not otherwise included unless requested. Automatic or preset groups are those which will be included unless they are specifically excluded by the user at the time the list of requested affiliation groups is created. This may be the situation where a user is so likely to affiliate with a given group on an ongoing basis that the selection is made automatic or preset, such as a home or family group.

The controller 202 may act to limit the number of selections that the user may pick, based on criteria such as but not limited to, the grade of service the wireless communication device is subscribed to or the model (good, better, best) of wireless communication device. An exemplary process for selecting the list of requested affiliation groups from the list of associated groups is covered in more detail in the discussion referencing FIG. 4. Note that while much of the above discussion has been from the perspective of the wireless communications device, ordinarily the final arbitar of whether a group is mandatory, optional, or automatic is often left to the network or network controller. Note also that while the discussions herein have concerned groups or talkgroups the principles may be applied to individual users or devices as well.

The controller 202, being coupled to the transmitter 206 is able to send the list of requested affiliation groups to a network controller 104. As described above, what is sent to the network controller may reflect a complete list of groups for affiliation or a list of changes, additions or deletions, to the current list of affiliated groups.

The list of requested affiliation groups is processed at the network controller 104, as described in greater detail below, resulting in a list of affiliated groups. The wireless communication device 200 will be configured in the network infrastructure 102 by the network controller 104 to allow dispatch and group communication with the groups as affiliated. This configuration amounts to adding the particular wireless communications device or specifically an identifier for the device to the affiliation list for each group that has been included in the list of affiliatied groups thereby insuring that the wireless communication device has communications privileges with each group within the list. The network controller 104 may send the list of affiliated groups to the wireless communication device 200, where it is received by the receiver 204. The controller 202 may then use the list to configure or manage the wireless communication device for operation using the list of affiliated groups particularly, but not limited to, the display of the new configuration of affiliated groups when selections are made for dispatch communication with individuals and for group communication. The list of affilated groups may contain as described above manditory or compulsory groups, optional groups and those automatic or preset groups that were not specifically excluded. The network controller 104 may include and forward further information such as a descriptive message, wherein the descriptive message comprises information regarding differences that may occur between the list of affiliated groups and the list of requested affiliation groups. Differences between the lists may be the result of the application of rules that may be device specific at the network controller 104 with respect to mandatory or compulsory groups, automatic or preset groups and any further limits in the number of allowable affiliation groups that may be applied by the network controller. The controller 202, by storing such information in the memory 208, in conjunction with the user interface 216 is able to display not only the list of associated groups as described above, but also such information regarding group affiliation as may be of interest to the user, including but not limited to, the list of requested affiliation groups, the list of affilated groups and the descriptive message.

It is likely in some exemplary embodiments that the controller 202 would be required to configure more than the display of the list to effect the new list of affiliated groups. In this case, it may be beneficial for the controller 202, when a new list of affilated groups is received, to not simply disaffiliate all groups before installing the new list, but to check for changes from the current configuration and only implement the changes. This may reduce the time required for such reconfiguration and may reduce or eliminate any time that the wireless communication device is not available for incoming and outgoing group call activity.

In an exemplary embodiment with respect to the list of associated groups it is envisioned that the wireless communication device 200 would be operable to receive the list of associated groups over the air from the network controller 104 or an authenticated source. This process for receiving and instantiating the list of associated groups is often referred to as discovery.

Figure 3:
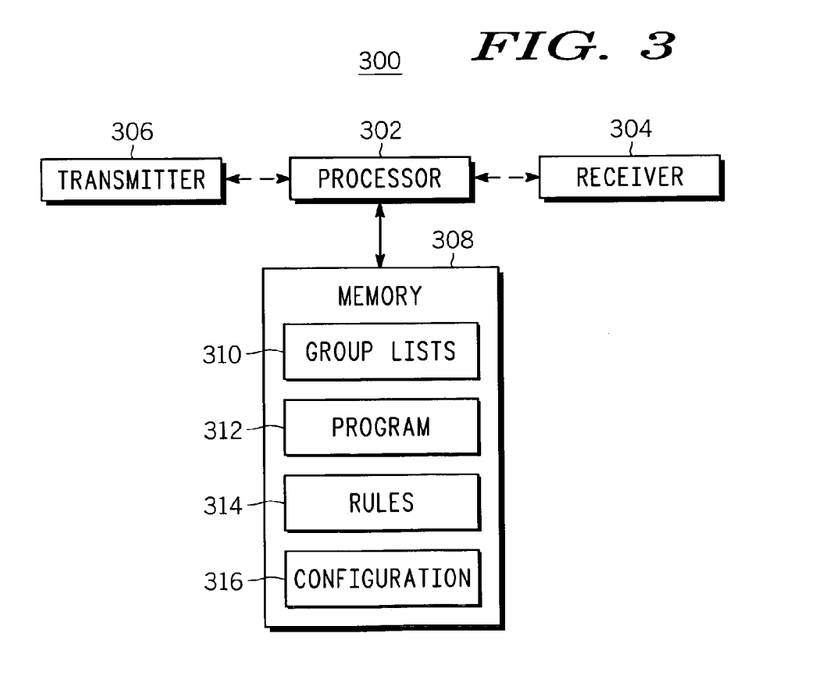
FIG. 3 depicts, in a simplified and representative form, a block diagram of a network controller suitable for use in the FIG. 1 system.

Referring to FIG. 3, a block diagram of a network controller in accordance with the current invention is discussed and described. The network controller 300 is arranged and constructed for supporting group affiliations of wireless communication devices and is comprised of a processor 302 coupled to a transceiver, typically wire line transceiver including both a receiver 304 and transmitter 306 suitable for sending and receiving messages with the wireless communication device 200 via the infrastructure 102. The transmitter, receiver and network controller are ordinarily part of the larger network infrastructure 102 and may be further coupled to other elements of the network infrastructure 102 such as a switch, routers, billing systems and the like. As discussed above, the network controller is any of a number of currently available computer servers as typically configured in cellular and other communication networks, such as those available from Sun Microsystems and Hewlett Packard. They typically comprise one or more processors 302, volatile and non-volatile memory 308 in the form of random access memory, read only memory, nonvolatile memory, magnetic disk storage and the like. The design and configuration of such computer servers will ordinarily be sufficient to support the requirements of the instant invention and any other system tasks managed therein when modified according to the inventive concepts and principles disclosed herein.

The processor 302 is further coupled to a memory 308. The memory includes group lists 310, where lists of associated and affiliated groups are stored, as well as membership information for the individual wireless communication device 200 memberships in those associated groups and similar information for a multiplicity of other such wireless devices. The memory 308 also includes program memory 312 wherein executable or object code, variables and parameters for operating the network controller resides. The object code in the program memory is responsible for, among other things, application of rules in the creation of a list of affiliated groups and instructions on how to accomplish reconfiguration of the network infrastructure 102 to accommodate the list of affiliated groups after creation. The memory 308 also includes rules 314 which are applied in the processing of a list of requested affiliations to create a list of affiliated groups. The rules 314 are often wireless device specific and may include information regarding application of mandatory or compulsory groups, automatic or preset groups and limits on the number of groups allowed. The network controller is ordinarily responsible, given guidance from an administrator or perhaps wireless device user, for provisioning various groups as mandatory, optional, etc. The memory 308 may also include memory 316 for storing information regarding configuration information corresponding to the wireless communication device with respect to current affiliations. This may be helpful in determining what changes are being requested over the current configuration of associated groups.

Usually a list of requested affiliation groups is received from a wireless communication device 200. This list may be a complete list of requested affiliation groups or it may be a list reflecting requested changes from the currently affiliated groups. The processor 302 may apply the rules 314 to determine the final composition of the list of affiliated groups. An exemplary application of rules in this manner is covered in detail below.

The processor 302 is further operable to configure or include the wireless communication device 200 as a member of the groups according to the list of affiliated groups. This insures that the wireless communication device has an opportunity to participate in group communications according to the list of affiliated groups. For example, once the device is affiliated with a group the network infrastructure 102 allows the wireless communication device 200 to initiate or receive dispatch communication with any of the groups in the list of affiliated groups. In the configuration process, the processor 302 may add and remove affiliations as requested, to configure or include the wireless communication device as a member of the groups according to the list of affiliated groups. The configuration process may be done in various ways. One way is removing current affiliations before adding or including the newly created list of affiliation groups. Another is changing only the groups affected, as in disaffiliating the groups that are no longer included and adding groups that are newly affiliated, while leaving unchanged those that are included before and after the updated list of affiliated groups is developed and applied.

The processor 302 is then able, via the transmitter 306, to send the list of affiliated groups to the wireless communication device 200 which may use the information as discussed above.

The processor 302, in the application of the rules to develop the list of affiliated groups from the list of requested affiliation groups may create a descriptive message comprising information regarding any differences between the requested and resultant lists of affiliated groups. An exemplary depiction of such a list is shown and discussed further with reference to FIG. 6. If a descriptive message is created, it may be provided to the wireless communication device 200 via the transmitter for use as described above and may be included with the list of affiliated groups or sent as a separate message.

An additional capability of the network controller 300 under the direction of the processor 302 is to send via the transmitter 306 a list of associated groups, that is, those to which the wireless communication device 200 is currently configured as a member. This list may be used by the wireless communication device 200 to inform the user of the wireless communication device about the groups to which membership applies, particularly as this relates to the selection process for creating the list of requested affiliation groups, as described above. Note that an attempt to create a list of requested affiliation groups may initiate forwarding the list of associated groups to the wireless communication device Referring to FIG. 4, a depiction of a group selection process 400 on a wireless communication device is discussed and described. The wireless communication device 200 obtains a list of associated groups 402, either wirelessly from the network controller 300, from the memory of the device, or perhaps via the user interface 216 when entered by a user. In the example shown the list of associated groups 402 has five entries representing various groups to which the wireless communication device 200 belongs as a member. Through a selection process, which may involve the user interface 216 in an interactive manner, a list of requested affiliation groups 404 is created. In the exemplary case shown, the user has selected the groups 'Home' at position 1 and 'Bowling' at position 2. The user has specifically excluded the group 'Customers' designated in this example, by 'X-Customer' in position 3. The dashed lines (--------) of position 4 indicate that the selection of groups into the list of requested affiliation groups 404 is limited to 3 and no further selections would be allowed in this representative example.

Figure 4:
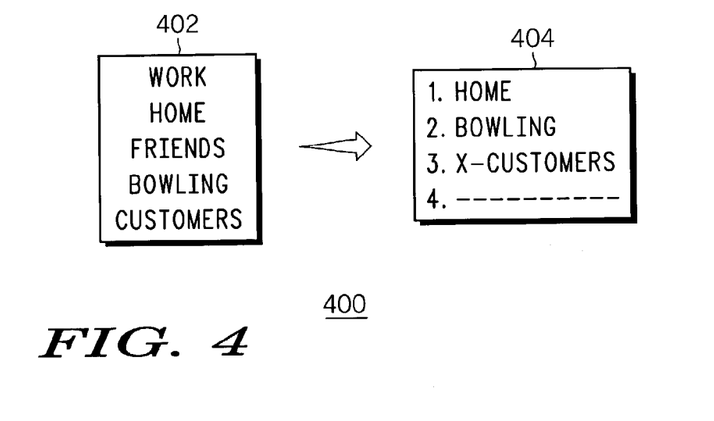
FIG. 4 depicts, in a representative form, group selection on a wireless communication device.
Figure 5:
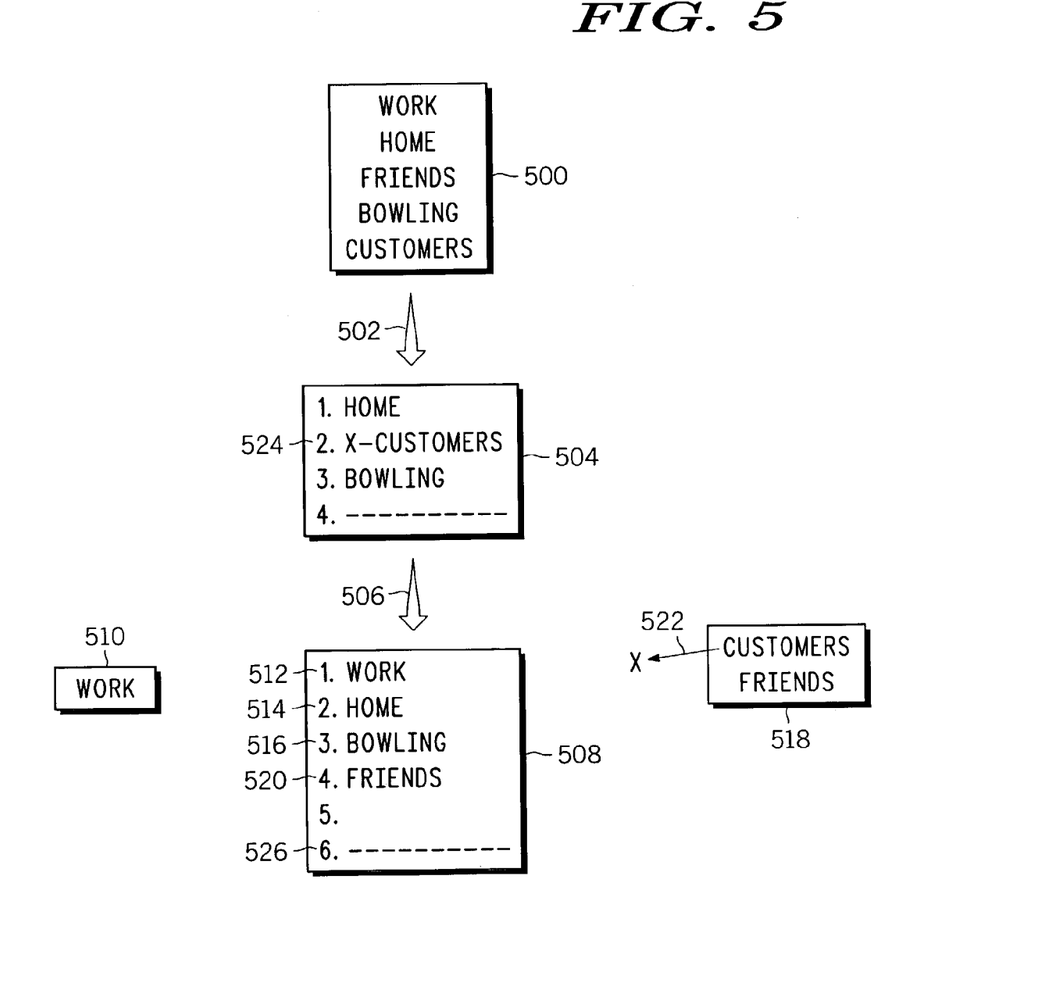
FIG. 5 depicts, in a representative form, application of rules for creation of a list of affiliated devices.

Referring to FIG. 5, a depiction of the application of rules for creation of a list of affiliated devices in accordance with the current invention is discussed and described. A list of associated groups 500, such as those depicted in FIG. 4, is present on or available to the wireless communication device 200. A group selection process 502 is applied as described in the discussion of FIG. 4 to create a list of requested affiliation groups 504. The list of requested affiliation groups is sent 506 to a network controller 300. The list of affiliated groups 508 is created by the application of rules in the following manner in this exemplary and representative case. A list of mandatory or compulsory groups 510 is consulted and found to contain one group, Work, which must be included in the list of affiliated groups 508, thereby accounting for first group, Work 512 in the list. Next, the list of requested groups 504 is consulted and the groups, Home 514 and Bowling 516 are included. The list of automatic or preset groups 518 is consulted and the group, Friends 520 is included. Although the group Customers 522 would ordinarily be added it is overridden by the specific exclusion of Customers 524 as noted from the list of requested affiliations 504. Customers 524 is therefore not included in the list of affiliated groups 508. Lastly, in this example, a check of any limit on the number of allowable groups is made and found to be set at five, denoted by the dashed line 526 (-------) in position 6. This example of the application of rules in the creation of the list of affiliated groups is purely for explanatory purposes. It is expected that other sequences for and specific application of rules as well as other rules sets would be applicable in other embodiments. One alternative is discussed in FIG. 9 and FIG. 10.

Figure 6:
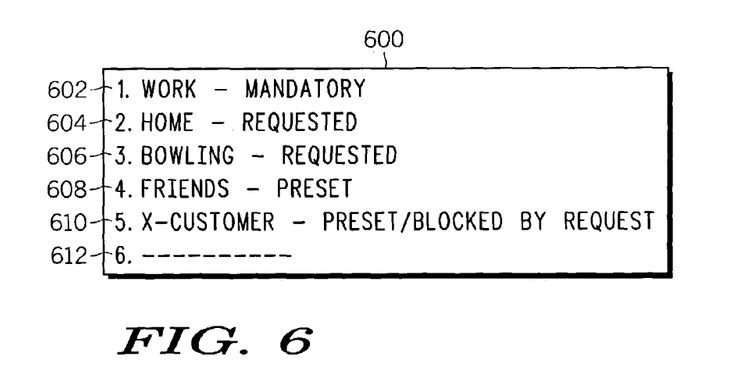
FIG. 6 depicts, in a simplified form, a descriptive list related to the list of affiliated groups.

Referring to FIG. 6 a simplified and representative form of a descriptive message or list related to the list of affiliated groups is discussed and described. The application of rules as discussed in the description of FIG. 5 resulted in a list of affiliated groups 508. The descriptive message or list 600 related to the creation of the list of affiliated groups 508 may be created in conjunction with that process. In this exemplary case, a reason for inclusion of each group on the list is given and a reason for exclusion of a group that may have been expected to be included is shown. In position 1 602 Work is shown as a mandatory group. In position 2 604 Home is shown as a requested group. In position 3 606, Bowling is shown as a requested group. In position 4 608, Friends is shown as a preset group. In position 5 610, X-Customer indicates that the preset Customer group would have been included but was specially excluded or blocked at the request of the user. In position 6 612 the dashed lines indicate that the list of affiliated groups may not exceed 5 in this representative example. Note that the descriptive message may only include information relative to differences between what was requested and what was provided. For example such a message in this example would speak to the Work and Friends groups.

Figure 7:
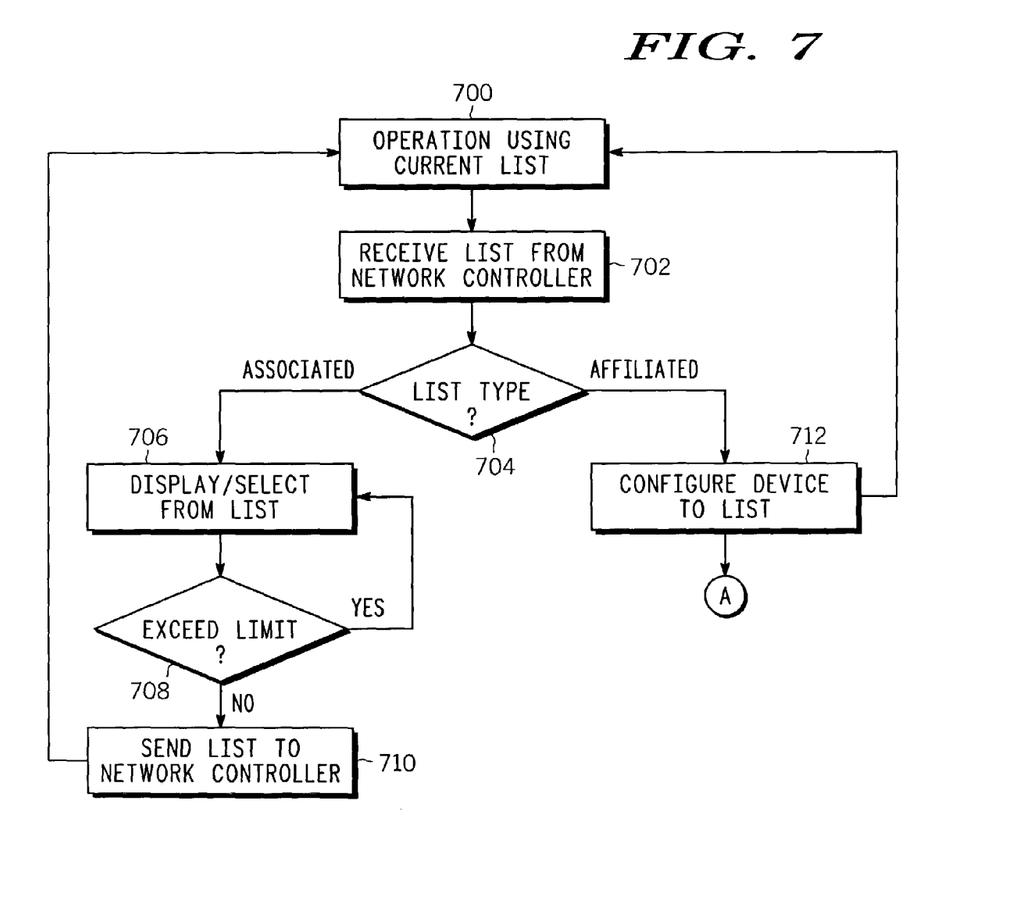
FIG. 7 depicts a flow chart of a method of obtaining a list of affiliated groups for a wireless communication device.

Referring to FIG. 7 a flow chart of a method of obtaining a list of affiliated groups for a wireless communication device will be discussed and described. A wireless communication device 200 is powered on and is operating normally at 700. According to the principles and concepts disclosed and discussed herein the device may be arranged to support a current list of affiliated groups. A list of groups is received at 702 and the list is tested 704 to determine whether the list is a list of affiliated groups or a list of associated groups. If the list is a list of associated groups, the branch 'Associated' is followed from 704. At the convenience of the user, for example, when a new set or list of affiliated groups is desired, the list of associated groups may be displayed and in any event a list of requested affiliation groups is created 706. The list is tested at 708 to determine if a limit to the number of selectable groups has been exceeded or any other rule has been breached. If such a limit has been exceeded or breach has occurred the process is returned to 706 following the Yes branch from 708 to allow the user to reduce the number of selections or otherwise correct the problem. If the limit has not been exceeded, the No branch from 708 is followed and the list of requested affiliation groups is sent 710 to the network controller 300. Operation of the wireless communication device continues without change in affiliated groups at step 700 pending a response from the network controller. Upon receipt of a list at 702, the list is again tested at 704 to determine the type of list. For the sake of example, the list is found to be a list of affiliated groups, the list being a portion of the list of requested affiliation groups as described above, the branch Affiliated from 704 is followed. The list is examined for content and the wireless communication device is configured for operation 712 using the list of affiliated groups. The method returns to 700 where the wireless communication device operates as thus configured. Anytime following step 712, operation may continue at A, as described below regarding FIG. 8. This flow is representative of an exemplary case and alternate flows to accomplish the same or like result are not excluded by this example.

Figure 8:
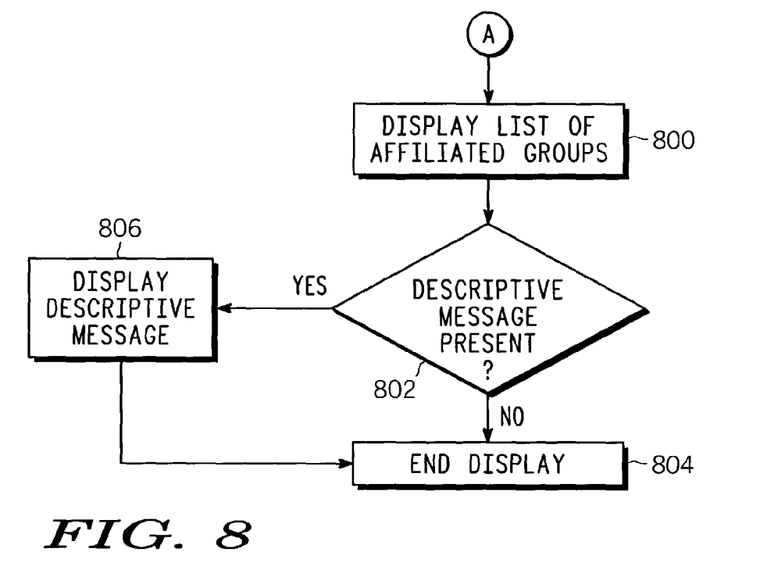
FIG. 8 depicts a flow chart that extends the flowchart of FIG. 7.

Referring to FIG. 8, a simplified and representative flow chart for an optional extension of the flowchart of FIG. 7 is discussed and described. Following from FIG. 7 point A, a user may choose to display the current list of affiliated groups at 800. An optional complement to the list of affiliated groups is a descriptive message. A test is made 802 to determine if the descriptive message is present. If not, the no branch of 802 is followed and the display may remain as shown or return to a default display 804. If a descriptive message is present the user may choose to display the message and the yes branch from 802 is followed and the descriptive message will be displayed at step 806. Following step 806 the display may remain as shown or returned to a default display 804. This flow is representative only and alternate flows that accomplish the same or like results are not excluded by this representation.

Figure 9:
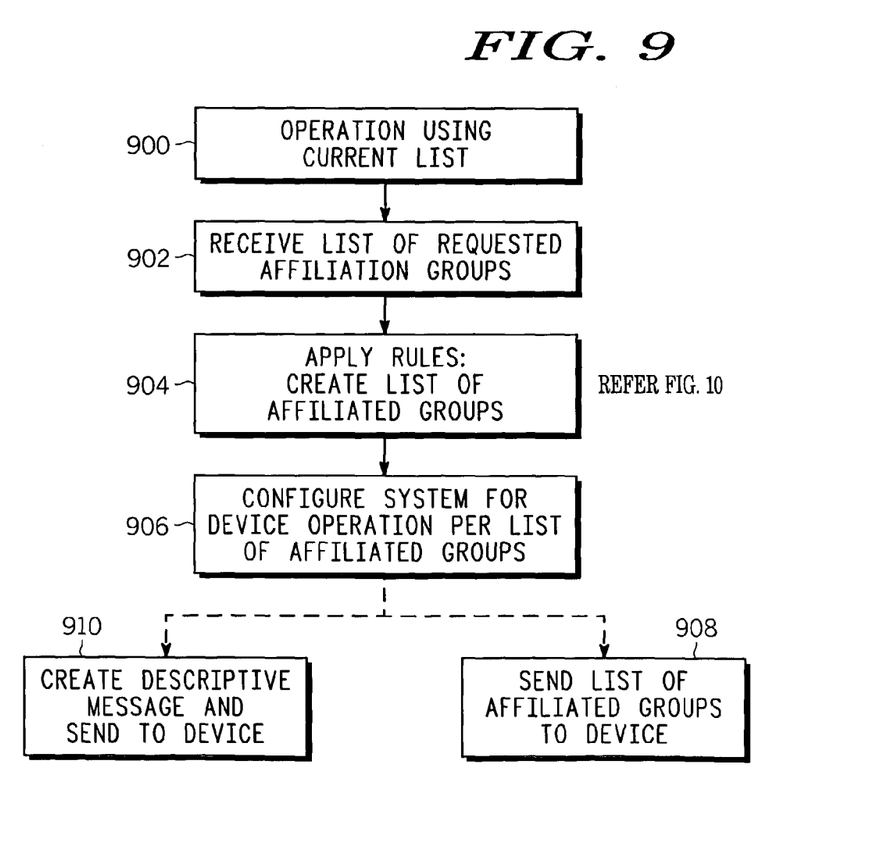
FIG. 9 depicts a flow chart of a method of facilitating the affiliation list at a network controller.

Referring to FIG. 9, a flow chart of a method of facilitating the affiliation list at a network controller will be discussed and described. The network controller 300 is configured or arranged to allow or facilitate a wireless communication device 200 to operate in accordance with a current list of affiliated groups 900. A new list of requested affiliation groups is received 902 and a process of applying rules is used to create a list of affiliated groups at 904. A representative process of applying rules to create the list of affiliated groups is discussed in more detail with reference to FIG. 10. The list of affiliated groups is used at 906 to configure the network infrastructure 102 so the wireless communication device 200 may operate in accordance with the list of affiliated groups. Shown optionally at 908, the network controller 300 may send the list of affiliated groups to the wireless communication device 200. The network controller 300 may further create a descriptive message 600 at 910 and send the descriptive message to the wireless communication device. This flow is representative of an exemplary case and alternate process flows to accomplish the same or like result are not excluded by this representation.

Figure 10:
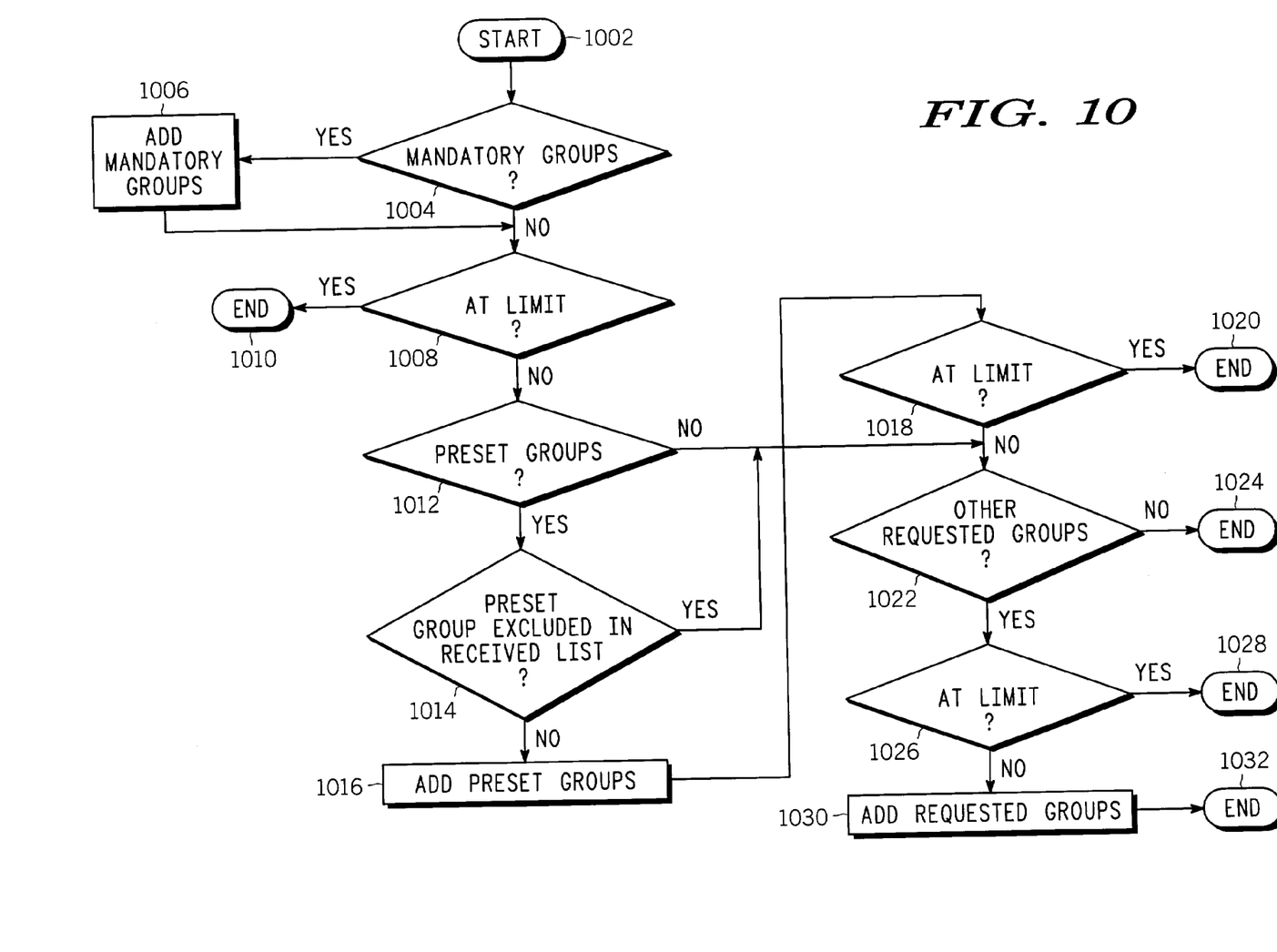
FIG. 10 depicts a flow chart showing more detail for the flow chart of FIG. 9.

Referring to FIG. 10 a flow chart showing additional detail for the process at 904 of FIG. 9 will be discussed and described. The process of applying the rules for creation of a list of affiliated groups from a list of requested affiliated groups has been generally discussed above and is begun at 1002. A system configuration for the wireless communication device 200 is analyzed at 1004 to see whether any mandatory groups are required. If so, branch yes is taken from 1004 and mandatory groups are added to the list of affiliated groups at 1006. Following processing of mandatory groups, 1008 is entered to check if a limit on the number of allowable groups has been reached. If yes, processing is halted at 1010 and flow continues at 906 of FIG. 9. If a limit of allowable groups has not been reached, processing of the list of affiliated groups continues at 1012 to determine if preset or automatic groups are available. If no, processing continues to 1022. If yes, processing continues at 1014 where the list of requested affiliation groups is analyzed to see if all of the preset or automatic groups have been specifically excluded. If yes, processing continues at 1022. If no, the preset group or groups, not otherwise excluded, are added at 1016. Following processing of preset or automatic groups 1018 is entered to check if a limit on number of allowable groups has been reached. If yes, processing is halted at 1020 and flow continues at 906 of FIG. 9. If a limit of allowable groups has not been reached, processing of the list of optional groups continues at 1022. If no optional groups are present in the list of requested affiliation groups the no branch from 1022 is followed, processing is ended at 1024 and flow continues at 906 of FIG. 9. If optional groups are present in the list of a requested affiliation groups, 1026 is entered where a test is applied to see if adding the optional groups will cause a limit of allowable groups in the list of affiliated groups to be exceeded. If yes, processing is halted at 1028 and flow continues at 906 of FIG. 9. In no, processing continues at 1030, where the optional groups are added to the list of affiliated groups. Processing is halted at 1032 and flow continues at 906 of FIG. 9. This flow is representative of an exemplary case and alternate flows to accomplish the same or like result are not excluded by this representation. For example, while a particular order of group selection has been described some may choose to change the order to Mandatory groups, specifically selected groups, and then preset groups.

The processes, apparatus, and systems, discussed above and the inventive principles thereof, are intended to and may alleviate problems associated with group affiliation. Using these principles of discovery, interactive selection and affiliation of groups will both simplify and expand the usefulness of dispatch communication in wireless communication devices capable of such communication.

The user of the wireless communication device is no longer required to have a priori knowledge of associated groups to be able to participate with them. Further, the conventional system limit of a single group affiliation or single pre-selected set of groups is no longer a barrier to a user desiring to have the opportunity for dispatch communication with members of more than one group.

Various embodiments of methods, systems, and apparatus for managing affiliation among associated groups so as to facilitate and provide for dispatch communication have been discussed and described. The disclosure extends to the constituent elements or equipment comprising such systems and specifically the methods employed thereby and therein. Using the inventive principles and concepts disclosed herein advantageously allows or provides for expanded capabilities in the selection of one or more affiliated groups from a list of associated groups, the use of rules for creation of the list of affiliated groups and expanded messages for users of wireless communication devices capable of supporting dispatch communication, which will be beneficial to users and system providers alike.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A wireless communication device arranged and constructed to request a group affiliation comprising:
    a user interface coupled and responsive to a controller operable to enable selection from a list of associated groups a list of requested affiliation groups;
    a transmitter coupled and responsive to the controller capable of sending the list of requested affiliation groups to a network controller;
    a receiver coupled and responsive to the controller operable to receive a list of affiliated groups from the network controller, the list of affiliated groups comprising a portion of the list of requested affiliation groups.

2. The wireless communication device of claim 1, wherein the list of affiliated groups further comprises:
    one of a compulsory affiliated group, a compulsory affiliated group being that which must be included in the list of affiliated groups, and an automatically affiliated group, an automatically affiliated group being that which is included when not specifically excluded in the list of requested affiliation groups.

3. The wireless communication device of claim 2 wherein the list of affiliated groups further comprises:
    a descriptive message comprising information regarding a difference between the list of affiliated groups and the list of requested affiliation groups.

4. The wireless communication device of claim 3 wherein:
    the controller and the user interface are further operable to display any one of the list of associated groups, the list of requested affiliation groups, the list of affiliated groups and the descriptive message.

5. The wireless communication device of claim 1 wherein the controller is further operable to enable the wireless communication device to participate in group communication according to the list of affiliated groups.

6. The wireless communications device of claim 1 wherein the receiver is further operable to receive the list of associated groups from the network controller.

7. A network controller arranged and constructed for supporting group affiliations of wireless communication devices, the network controller comprising:
    a receiver operable to receive a list of requested affiliation groups from a wireless communication device the list of requested affiliation groups comprising a plurality of associated groups;
    a processor operable to process, according to a set of rules, the list of requested affiliation groups to create a list of affiliated groups further operable to include the wireless communication device as a member of a set of groups according to the list of affiliated groups thereby insuring that the wireless communication device has an opportunity to participate in group communication accoding to the list of affiliated groups; and a transmitter, coupled and responsive to the processor, capable of sending the list of affiliated groups to the wireless conununication device; and wherein the processor provides a message comprising information regarding a difference between the list of affiliated groups and the list of requested affiliation groups to the transmitter for sending to the wireless communication device.

8. A network controller arranged and constructed for supporing group affiliations of wireless communication devices, the network controller comprising:

a receiver operable to receive a list of requested affiliation groups from a wireless communication device the list of requested affiliation groups comprising a plurality of associated groups;

a processor operable to process, according to a set of rules, the list of requested affiliation groups to create a list of affiliated groups further operable to include the wireless communication device as a member of a set of groups according to the list of affiliated groups thereby insuring that the wireless communication device has an opportunity to participate in group communication according to the list of affiliated groups; and a transmitter, coupled and responsive to the processor, capable of sending the list of affiliated groups to the wireless communication device; and wherein the transmitter, responsive to the processor, is further capable of sending to the wireless communication device a list of associated groups, the list of associated groups being the list of groups from which the wireless communication device may choose to affiliate.

9. A method of for a wireless communication device to request a group affiliation comprising:

selecting from a list of associated groups to create a list of request affiliation groups;

sending the list of requested affiliation groups to a network infrastructure: and receiving from the network infrastructure a list of affiliated groups, the list of affiliated groups comprising a portion of the list of requested affiliation groups.

10. The method of claim 9 further comprising:

configuring the wireless communication device for operation using the list of affiliated groups.

11. The method of claim 9 wherein the list of affiliated groups further comprises one of a compulsory affiliated group, a compulsory affiliated group being a group that must be included in the list of affiliated groups, and a preset affiliated group, a preset affiliated group being a group that is included when not specifically excluded in the list of requested affiliation groups.

* * * * *